United States Patent
Horiuchi et al.

(10) Patent No.: US 11,153,019 B2
(45) Date of Patent: *Oct. 19, 2021

(54) MOBILE STATION AND RECEPTION QUALITY MEASUREMENT METHOD

(71) Applicant: Panasonic Intellectual Property Corporation of America, Torrance, CA (US)

(72) Inventors: Ayako Horiuchi, Kanagawa (JP); Masayuki Hoshino, Kanagawa (JP); Seigo Nakao, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,645

(22) Filed: Apr. 9, 2020

(65) Prior Publication Data

US 2020/0235831 A1    Jul. 23, 2020

Related U.S. Application Data

(63) Continuation of application No. 16/033,123, filed on Jul. 11, 2018, now Pat. No. 10,651,959, which is a (Continued)

(30) Foreign Application Priority Data

Dec. 25, 2013    (JP) ................................. 2013-267112

(51) Int. Cl.
*H04B 17/318* (2015.01)
*H04L 5/00* (2006.01)
*H04W 48/12* (2009.01)

(52) U.S. Cl.
CPC .......... *H04B 17/318* (2015.01); *H04L 5/005* (2013.01); *H04W 48/12* (2013.01)

(58) Field of Classification Search
None
See application file for complete search history.

(56) References Cited

U.S. PATENT DOCUMENTS 8,897,702 B2 * 11/2014 Niu ...................... H04B 17/345
                                                                455/41.1
9,307,437 B2    4/2016 Yang et al.
9,426,706 B2    8/2016 Ishii et al.
(Continued)

FOREIGN PATENT DOCUMENTS

CN    102197612 A    9/2011
CN    102461023 A    5/2012
(Continued)

OTHER PUBLICATIONS

3GPP TR 36.872 V12.0.0, "Small cell enhancements for E-UTRA and E-UTRAN—Physical layer aspects (Release12)" Sep. 2013, 78 pages.
(Continued)

*Primary Examiner* — Ayaz R Sheikh
*Assistant Examiner* — Faiyazkhan Ghafoerkhan
(74) *Attorney, Agent, or Firm* — Seed IP Law Group LLP

(57) ABSTRACT

Received Signal Strength Indicator (RSSI) is measured accurately even in a case where a discovery signal is transmitted. A receiver receives a plurality of subframes, at least one of which includes a discovery signal, and a measurer measures Reference Signal Reception Power (RSRP) using a first resource in which the discovery signal is mapped, measures RSSI using a second resource different from the first resource for which the discovery signal is
(Continued)

mapped, and calculates Reference Signal Reception Quality (RSRQ) using RSRP and RSSI.

6 Claims, 11 Drawing Sheets

Related U.S. Application Data continuation of application No. 15/088,263, filed on Apr. 1, 2016, now Pat. No. 10,050,729, which is a continuation of application No. PCT/JP2014/006063, filed on Dec. 4, 2014.

(56) References Cited

U.S. PATENT DOCUMENTS

| | | | |
|---|---|---|---|
| 9,526,064 B2 | 12/2016 | Kim et al. | |
| 9,699,703 B2* | 7/2017 | Ogawa | H04L 1/20 |
| 9,712,262 B2 | 7/2017 | Yi et al. | |
| 9,749,075 B2 | 8/2017 | Liao et al. | |
| 9,801,084 B2 | 10/2017 | Nagata et al. | |
| 9,888,431 B2 | 2/2018 | Hwang et al. | |
| 10,050,729 B2* | 8/2018 | Horiuchi | H04L 5/005 |
| 10,651,959 B2* | 5/2020 | Horiuchi | H04B 17/318 |
| 2010/0309797 A1* | 12/2010 | Lindoff | H04B 17/318 370/252 |
| 2011/0039551 A1 | 2/2011 | Tsuboi et al. | |
| 2011/0200004 A1 | 8/2011 | Nakashima et al. | |
| 2013/0322376 A1* | 12/2013 | Marinier | H04L 5/0057 370/329 |
| 2014/0192672 A1* | 7/2014 | Seo | H04L 5/0048 370/252 |
| 2014/0334320 A1 | 11/2014 | Liu et al. | |
| 2014/0362793 A1* | 12/2014 | Chai | H04W 24/00 370/329 |
| 2015/0163008 A1* | 6/2015 | Kim | H04L 5/0048 370/252 |
| 2015/0215852 A1 | 7/2015 | Gou et al. | |
| 2015/0358094 A1* | 12/2015 | Yi | H04W 72/08 370/252 |
| 2015/0358899 A1* | 12/2015 | Ko | H04W 24/08 370/252 |
| 2016/0066255 A1* | 3/2016 | Marinier | H04W 48/16 370/350 |
| 2016/0192334 A1* | 6/2016 | Takeda | H04W 72/0413 370/329 |
| 2016/0218816 A1* | 7/2016 | Horiuchi | H04B 17/318 |
| 2016/0219453 A1* | 7/2016 | Harada | H04B 17/318 |
| 2016/0242061 A1* | 8/2016 | Harada | H04W 72/042 |
| 2017/0048917 A1 | 2/2017 | Kim | |
| 2017/0111130 A1 | 4/2017 | Zhao et al. | |
| 2018/0241525 A1 | 8/2018 | Ouchi et al. | |
| 2018/0323885 A1* | 11/2018 | Horiuchi | H04B 17/318 |
| 2020/0235831 A1* | 7/2020 | Horiuchi | H04L 5/005 |

FOREIGN PATENT DOCUMENTS

| | | |
|---|---|---|
| CN | 102883408 A | 1/2013 |
| JP | 2014-204278 A | 10/2014 |
| JP | 2015-053667 A | 3/2015 |
| JP | 2015-065606 A | 4/2015 |
| JP | 2015-065607 A | 4/2015 |
| JP | 2017-517204 A | 6/2017 |
| WO | 2008/123995 A2 | 10/2008 |
| WO | 2012/096299 A1 | 7/2012 |
| WO | 2012/116031 A1 | 8/2012 |
| WO | 2017/078148 A1 | 5/2017 |

OTHER PUBLICATIONS

3GPP TR 36.842 V1.0.0, "Study on Small Cell Enhancements for E-UTRA and E-UTRAN—Higher layer aspects(Release12)" Nov. 2013, 68 pages.

3GPP TS 36.214 V11.0.0, "Physical layer; Measurements (Release11)" Sep. 2012, 14 pages.

CATT, "On D2D Discovery," R1-131896, Agenda Item: 6.2.7.3, 3GPP TSG RAN WG1 Meeting #73, Fukuoka, Japan, May 20-24, 2013, 5 pages.

Chinese Search Report, dated Aug. 15, 2019, for the related Chinese Patent Application No. 201480042940.5.

CMCC, "Enhancement of Small Cell operation efficiency," R1-135634, Agenda Item: 6.2.6.2, 3GPP TSG RAN WG1 Meeting #75, San Francisco, USA, Nov. 11-15, 2013, 4 pages.

English Translation of Chinese Search Report, dated Jun. 20, 2018, for the related Chinese Patent Application No. 2014800429405, 2 pages.

Fujitsu, "Discussion on discovery and measurement of turned-off small cells," R1-134257, Agenda Item: 7.2.6.2.2, 3GPP TSG RAN WG1 Meeting #74 bis, Guangzhou, China, Oct. 7-11, 2013, 5 pages.

Huawei et al., "Design target for discovery enhancement," R1-134062, Agenda Item: 7.2.6.2.2, 3GPP TSG RAN WG1 Meeting #74bis, Guangzhou, China, Oct. 7-11, 2013, 3 pages.

Huawei et al., "Design target for discovery enhancement," R1-135381, Agenda Item: 6.2.6.2, 3GPP TSG RAN WG1 Meeting #75, San Francisco, USA, Nov. 11-15, 2013, 4 pages.

Huawei et al., "Discovery and measurement enhancements," R1-135036, Agenda Item: 6.2.6.2, 3GPP TSG RAN WG1 Meeting #75, San Francisco, USA, Nov. 11-15, 2013, 5 pages.

Indian Examination Report, dated Nov. 14, 2019, for the related Indian Patent Application No. 201647011077.

InterDigital, "Enhancements in support of Small Cell on/off Operation," R1-134562, Agenda item: 7.2.6.2.1, 3GPP TSG-RAN WG1 Meeting #74bis, Guangzhou, China, Oct. 7-11, 2013, 6 pages.

International Search Report of PCT application No. PCT/JP2014/006063 dated Feb. 3, 2015, 4 pages.

NTT DOCOMO, "Small Cell Discovery for Efficient Small Cell on/off Operation," R1-133457, Agenda Item: 7.2.6.1.2, 3GPP TSG RAN WG1 Meeting #74, Barcelona, Spain, Aug. 19-23, 2013, 8 pages.

NTT DOCOMO, "Views on target design for small cell discovery enhancement," R1-135515, Agenda Item: 6.2.6.2, 3GPP TSG RAN WG1 Meeting #75, San Francisco, USA, Nov. 11-15, 2013, 5 pages.

MediaTek Inc., "New Small Cell Discovery and Measurement Scheme based on CRS," R1-135434, Agenda Item: 6.2.6.2, 3GPP TSG-RAN WG1 #75, San Francisco, USA, Nov. 11-15, 2013, 7 pages.

MediaTek Inc., "Performance Evaluation for Small Cell Discovery Using," R1-132280, Agenda Item: 6.2.5.2.2, 3GPP TSG-RAN WG1 #73, Fukuoka, Japan, May 20-24, 2013, 5 pages.

MediaTek Inc., "Performance evaluation for small cell discovery using legacy reference signals," R1-131187, Agenda Item: 7.2.5.3.2, 3GPP TSG-RAN WG1 #72bis, Chicago, USA, Apr. 15-19, 2013, 5 pages.

Panasonic, "Discussion on small cell on/off transition time reduction procedure," R1-135397, Agenda Item: 6.2.6.2, 3GPP TSG RAN WG1 Meeting #7, San Francisco, USA, Nov. 11-15, 2013, 4 pages.

ZTE, "On Measurements based on Companion Discovery Signal (CDS)," R1-135351, Agenda Item: 6.2.6.2, 3GPP TSG-RAN WG1 Meeting #75, San Francisco, USA, Nov. 11-15, 2013, 7 pages.

* cited by examiner

MOBILE STATION AND RECEPTION QUALITY MEASUREMENT METHOD

BACKGROUND

Technical Field

The present disclosure relates to a mobile station and a reception quality measurement method.

Description of the Related Art

In recent years, in cellular mobile communication systems, it has become popular to provide information in a multimedia form such that not only audio data but also still image data, moving image data, or the like with a large data size is transmitted. In LTE-Advanced (Long Term Evolution Advanced), an active investigation has been made to achieve a high transmission rate using a wireless broadband, a Multiple-Input Multiple-Output (MIMO) transmission technique, and an interference control technique.

Furthermore, in LTE-Advanced, it is under consideration to provide a small cell, which is a base station with low transmission power (also referred to as e Node B (eNB)), to achieve a high transmission rate at a hot spot. It is under consideration that a carrier frequency is assigned to the small cell such that the assigned frequency is different from that used in a macro cell, which is a base station with high transmission power, (see, for example, 3GPP TR 36.872 V12.0.0 (2013-09), Small Cell Enhancements for E-UTRA and E-UTRAN Physical layer Aspects).

It is also under consideration to allow a mobile station (which is also called user equipment (UE) or a terminal) to by itself connect to a small cell. It is also under consideration to use carrier aggregation, in which a plurality of component carriers are used, to allow a mobile station to connect to both a macro cell and a small cell. Furthermore, it is also under consideration to employ dual connectivity to allow a mobile station to connect to a Master eNB (MeNB) and a Secondary eNB (SeNB) (see, for example, 3GPP TR 36.842 V1.0.0 (2013-11), Study on Small Cell Enhancements for E-UTRA and E-UTRAN Higher layer Aspects). In the Dual Connectivity, a cell that manages mobility of mobile stations is called MeNB. Other than MeNB, a cell that assigns a resource to a mobile station is called SeNB. A mobile station is allowed to use both a resource of MeNB and that of SeNB.

In a case where a mobile station connects by itself to a small cell, the mobile station is likely to move to the small cell in response to receiving a handover command from another cell. In a case where the carrier aggregation is used, a small cell is likely to be set as a Secondary Cell (SCell). In the case of the Dual connectivity, a small cell is likely to be set as SeNB. In any case, before a mobile station makes a connection to a cell, the mobile station needs to identify the cell, achieve synchronization with the cell, and measure reception quality between the cell and the mobile station.

Conventionally, the cell synchronization is achieved via Primary Synchronization Signal (PSS)/Secondary Synchronization Signal (SSS) transmitted at intervals of 5 msec. Thereafter, a cell ID is identified and then Radio Resource Management (RRM) is performed using reception power of Cell specific Reference Signal (CRS) and reception power of the whole band.

RRM is used in measurement for mobility management such as a cell selection or the like. In RRM, Reference Signal Reception Power (RSRP) or Reference Signal Reception Quality (RSRQ) is measured. In a case where RSRP of an adjacent cell satisfies a predetermined criterion, for example, in a case where RSRP of the adjacent cell is higher by 3 dB than that of a current cell, a mobile station makes a report of a cell ID and RSRP of this adjacent cell. Here in a case where information on the cell ID of the adjacent cell has been informed, the mobile station is capable of detecting the cell using the cell ID.

RSRP is average reception power of CRS, and RSRQ is given by N*RSRP/RSSI (see, for example, 3GPP TS 36.214 V11.0.0 (2012-9), Physical layer; Measurements) where N is the number of resource blocks (RBs) in a band in which Received Signal Strength Indicator (RSSI) is measured, and RSSI is the average reception power in an OFDM symbol. In a case where no instruction is given from a higher layer, RSSI is measured in an OFDM (Orthogonal Frequency Division Mutiplexing) symbol in which CRS is mapped. On the other hand, in a case where a subframe in which RSSI is to be measured is specified from the higher layer, RSSI is measured in all OFDM symbols in the specified subframe. RSRP corresponds to reception power of a certain cell and RSSI corresponds to reception power of a whole band, and thus RSRQ indicates the ratio of the reception power of the certain cell to the reception power of the whole band including interference. RSRQ is a parameter including an amount of interference varying depending on the band, and thus RSRQ is used in comparison (interband comparison) in terms of reception quality of a cell between different bands.

As described above, in the cell selection based on the RSRQ criterion, a cell is selected by comparing reception quality of cells between different bands. In this process, if traffic per band is large, there are many cells that may cause interference, and thus RSSI has a large value and RSRQ has a small value. On the other hand, if traffic per band is small, there are a small number of cells that may cause interference, and thus RSSI has a small value and RSRQ has a large value. Therefore, in the cell selection based on the RSRQ criterion, the difference in traffic between bands is taken into account, which results in an increase in the probability that a cell with a band having a low traffic is selected. When a cell with a band having a low traffic is selected, less interference is achieved and it is possible to use much resource of the cell, and thus it is possible to advantageously achieve an increase in user throughput.

BRIEF SUMMARY

However, when a resource used in the RSSI measurement includes a discovery signal, it becomes impossible to reflect an actual traffic in RSRQ. The discovery signal is a signal transmitted from a cell in the OFF state in which the cell has no traffic. At a mobile station, if a resource used in the RSSI measurement includes discovery signals transmitted from a plurality of cells in the OFF state, the discovery signals cause an increase in measured RSSI, and a reduction occurs in RSRQ value. As described above, if a discovery signal is transmitted from a base station to a terminal, it becomes difficult to accurately measure RSSI.

One non-limiting and exemplary embodiment provides a mobile station and a reception quality measurement method capable of accurately measuring RSSI even in a case where a discovery signal is transmitted.

In one general aspect, the techniques disclosed here feature that a mobile station includes a receiver that receives a plurality of subframes, at least one of which includes a discovery signal, and a measurer that measures Reference Signal Reception Power (RSRP) using a first resource in which the discovery signal is mapped, measures Received Signal Strength Indicator (RSSI) using a second resource different from the first resource for which the discovery signal is mapped, and calculates Reference Signal Reception Quality (RSRQ) using the RSRP and the RSSI, the RSRQ being to be used by the mobile station to compare reception qualities between inter band-cells.

The present disclosure makes it possible to accurately measure RSSI even in a case where a discovery signal is transmitted from a base station to a terminal.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
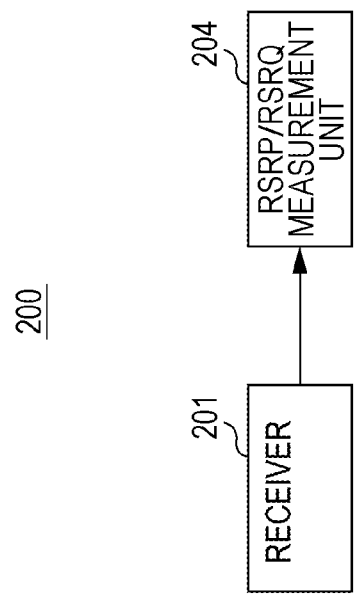
FIG. 1 is a block diagram illustrating a configuration of main parts of a mobile station according to a first embodiment of the present disclosure.

Embodiments of the present disclosure are described in detail below with reference to drawings. Note that in the embodiments, similar constituent elements are denoted by similar reference symbols, and a duplicated description thereof is omitted.

Underlying Knowledge Forming Basis of the Present Disclosure

In introduction of small cells, it is under consideration to introduce an OFF state in a small cell to suppress interference from the small cell and reduce power consumption of the small cell. When a small cell is in the OFF state, the small cell is in a "halt state" in which no data is assigned to a mobile station. However, if transmission of all signals from small cells is stopped, a mobile station cannot detect any small cell. Thus, to allow a mobile station to detect a small cell even in the OFF state, it is under consideration to allow a small cell to transmit a discovery signal.

The discovery signal is used for a similar purpose to the purpose of conventional PSS/SSS/CRS. That is, the discovery signal is a signal for identifying a cell in the OFF state, achieving synchronization, and managing radio resources. To suppress interference and power consumption, it is under consideration to reduce a transmission rate (to increase a transmission repetition period) of the discovery signal compared with the conventional PSS/SSS/CRS. It is under consideration to transmit discovery signals from a plurality of cells or transmission points using the same subframe such that a mobile station detects the plurality of cells at the same time. In designing of the discovery signal, it is under consideration to obtain a signal used as the discovery signal by changing a repetition period, a band, or the like of an existing signal in the LTE-Advanced system. Candidates for the signal to be used include Positioning Reference Signal (PRS), Channel State Information (CSI)-RS, PSS/SSS/CRS, etc. By transmitting the discovery signal not only in the OFF state but also in an ON state continuously after transition is made from the OFF state to the ON state, it becomes possible to support the conventional detection method and the new detection method without switching the method.

However, when a discovery signal is transmitted from a base station to a terminal, if the discovery signal is included in a resource used in the RSSI measurement, this makes it difficult to accurately measure RSSI. More specifically, the discovery signal may cause an increase in measured RSSI and a reduction in RSRQ value. The above-described reduction in RSRQ value caused by the discovery signal makes it difficult to select a cell with a band in which actual traffic is low (that is, a cell in which actual RSRQ value is large).

The inventors of the present disclosure have made investigation on the problems described above, and have obtained knowledge described below, which have allowed it to achieve embodiments of the present disclosure. That is, it is possible to accurately measure RSSI by measuring Reference Signal Reception Power (RSRP) using a resource in which a discovery signal is mapped, measuring Received Signal Strength Indicator (RSSI) using a resource different from the resource in which the discovery signal is mapped, and calculating Reference Signal Reception Quality (RSRQ) using RSRP and RSSI.

First Embodiment

Outline of Communication System

A communication system according to the present embodiment includes a base station 100 and a mobile station 200. This communication system is, for example, a LTE-Advanced system. The base station 100 is, for example, a base station supported in the LTE-Advanced system. A mobile station 200 is, for example, a mobile station supported in the LTE-Advanced system.

In the base station 100 according to the present embodiment, an OFF state is introduced, and the OFF state and the ON state are switched in the operation. The base station 100 transmits a discovery signal to the mobile station 200 at least in the OFF state. That is, the base station 100 is a cell that supports the discovery signal.

FIG. 1 is a block diagram illustrating a configuration of main parts of the mobile station 200 according to the present embodiment.

In the mobile station 200, a receiver 201 receives a discovery signal. An RSRP/RSRQ measurement unit 204 measures RSRP (Reference Signal Reception Power) using a resource in which the discovery signal is mapped. Furthermore, the RSRP/RSRQ measurement unit 204 measures RSSI (Received Signal Strength Indicator) using a resource different from the resource in which the discovery signal is mapped. The RSRP/RSRQ measurement unit 204 then calculates RSRQ (Reference Signal Reception Quality) using RSRP and RSSI.

Configuration of Base Station 100

Figure 2:
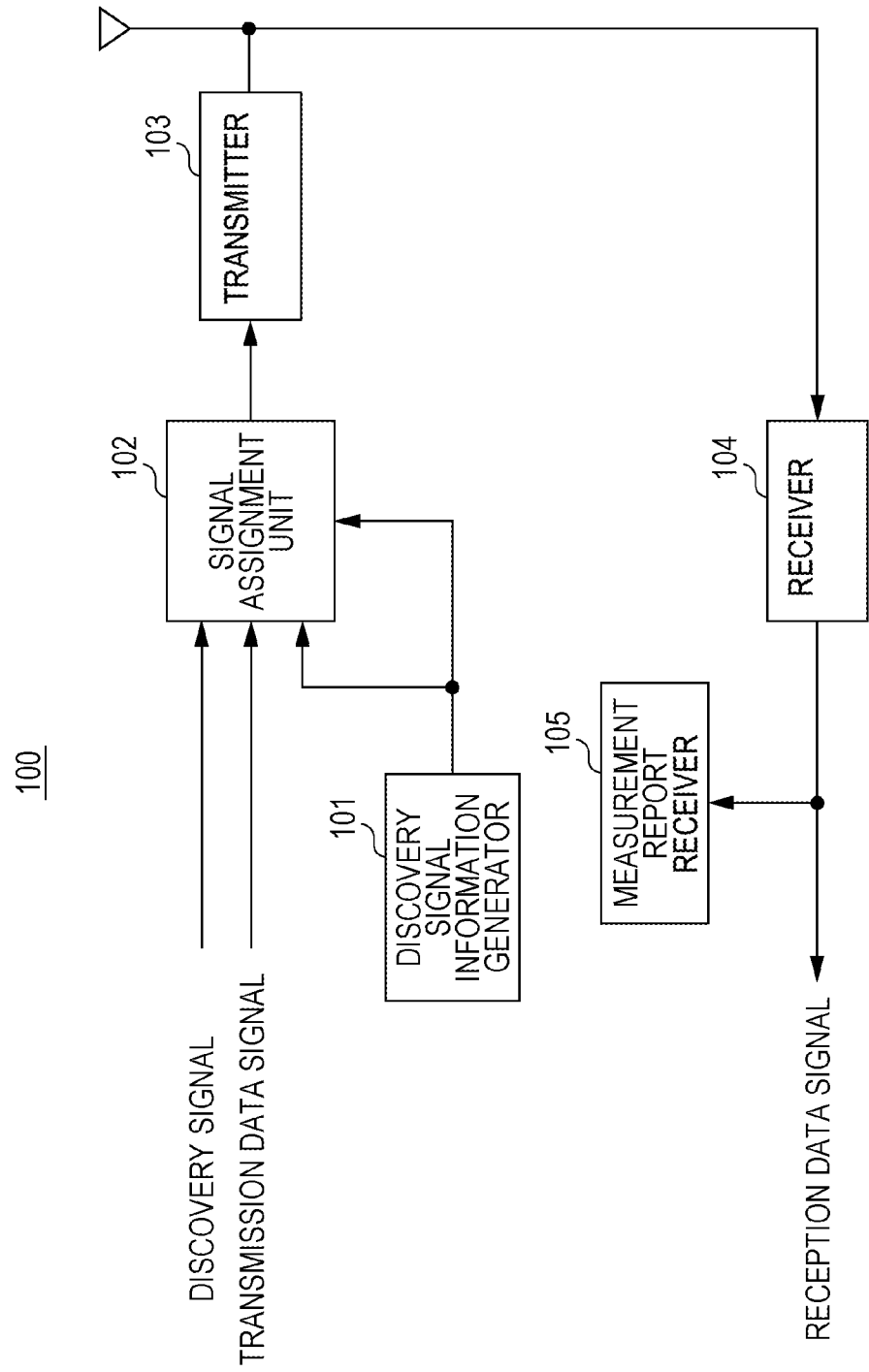
FIG. 2 is a block diagram illustrating a configuration of a base station according to the first embodiment of the present disclosure.

FIG. 2 is a block diagram illustrating a configuration of the base station 100 according to the present embodiment. In FIG. 2, the base station 100 includes a discovery signal information generator 101, a signal assignment unit 102, a transmitter 103, a receiver 104, and a measurement report receiver 105.

The discovery signal information generator 101 generates discovery signal information indicating a transmission repetition period, a transmission subframe, a transmission frequency band, a bandwidth, or an RB (Resource Block) of the discovery signal. The discovery signal information generator 101 outputs the discovery signal information as a higher layer control signal to the signal assignment unit 102.

Note that the discovery signal information generator 101 may generate not only discovery signal information associated with the cell managed by the base station 100 but also discovery signal information associated with another adjacent cell. This makes it possible for the mobile station 200 to acquire information from a cell in terms of a discovery signal transmitted by another cell.

The signal assignment unit 102 assigns a discovery signal to a particular resource based on the control signal including the discovery signal information received from the discovery signal information generator 101. The discovery signal is assigned in a case where the base station 100 does not perform assignment of a transmission data signal (that is, Physical Downlink Shared Channel (PDSCH)) (in the OFF state in which data transmission is not performed). Furthermore, the signal assignment unit 102 assigns a transmission data signal and a control signal to a particular resource. Thus by assigning the discovery signal or the control signal and the transmission data signal to the particular resource in the above-described manner, a transmission signal is formed. The formed transmission signal is output to the transmitter 103.

The transmitter 103 performs a wireless transmission process such as up-converting on the transmission signal received from the signal assignment unit 102 and transmits the transmission signal to the mobile station 200 via an antenna.

The receiver 104 receives the signal transmitted from the mobile station 200 via an antenna and outputs the reception signal to the measurement report receiver 105, and the receiver 104 extracts a reception data signal from the reception signal.

The measurement report receiver 105 extracts a measurement report, transmitted from the mobile station 200, from the reception signal received from the receiver 104, and outputs the extracted measurement report to a higher layer. The measurement report is generated by the terminal 200 using RSRP or RSRQ of the base station 100, another base station, or a transmission point, and the measurement report includes information used in managing movement and connection such as a cell selection by the mobile station 200.

Configuration of Mobile Station 200

Figure 3:
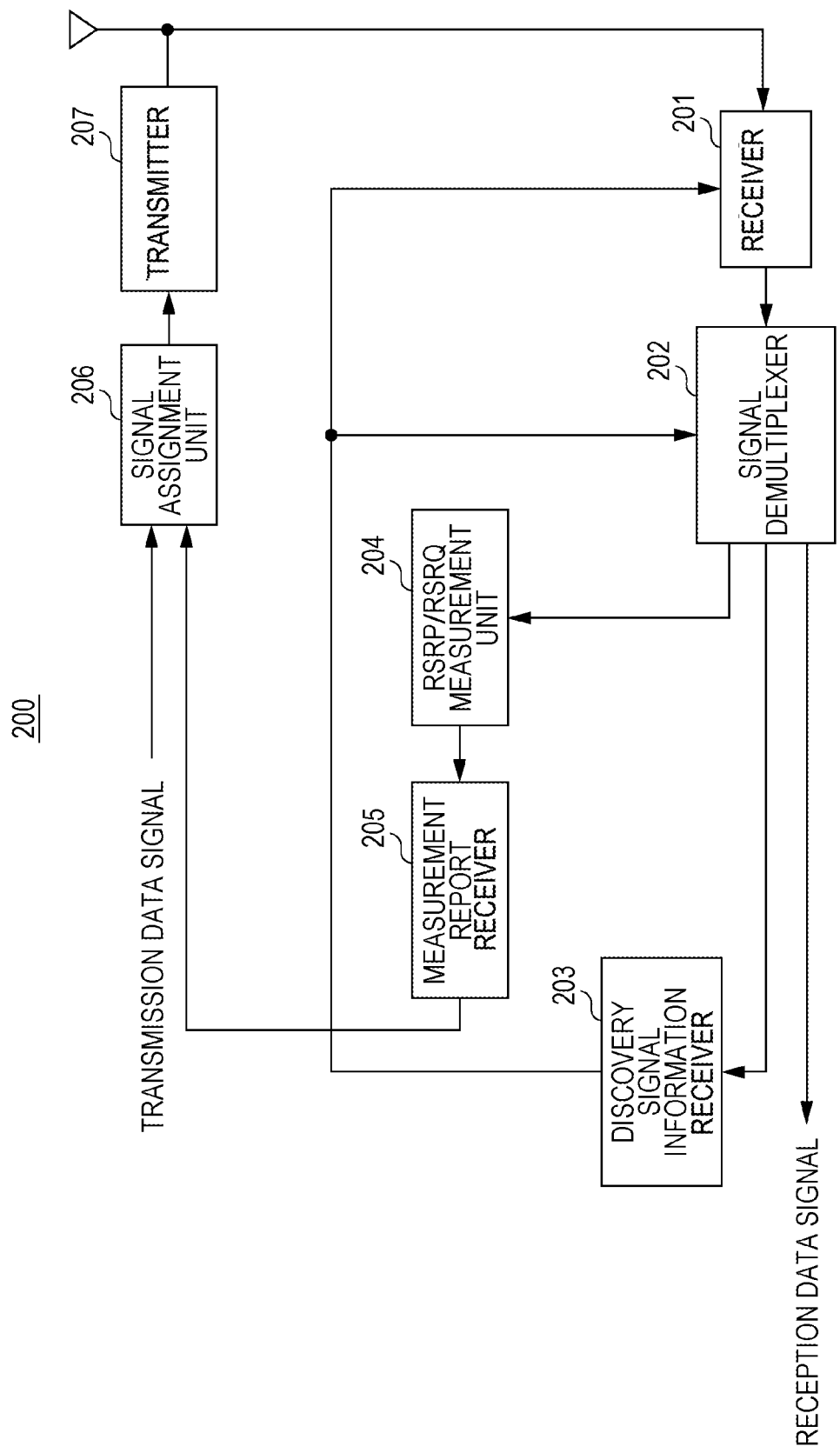
FIG. 3 is a block diagram illustrating a configuration of a mobile station according to the first embodiment of the present disclosure.

FIG. 3 is a block diagram illustrating a configuration of the mobile station 200 according to the present embodiment. In FIG. 3, the mobile station 200 includes a receiver 201, a signal demuliplexer 202, a discovery signal information receiver 203, an RSRP/RSRQ measurement unit 204, a measurement report generator 205, a signal assignment unit 206, and a transmitter 207.

The receiver 201 receives a signal via an antenna, performs a reception process such as down-converting, and outputs the resultant signal to the signal demuliplexer 202. The reception signal received by the receiver 201 includes the discovery signal or the control signal and the data signal transmitted from the base station 100. In a case where information received from the discovery signal information receiver 203 indicates that a discovery signal should be detected in a frequency band different from a reception frequency band of the base station 100, then the receiver 201 changes the reception frequency band and receives the signal.

The signal demuliplexer 202 demultiplexes the discovery signal and the signal for use in the RSSI measurement from the reception signal received from the receiver 201 based on the discovery signal information received from the discovery signal information receiver 203, and the signal demuliplexer 202 outputs them to the RSRP/RSRQ measurement unit 204. Furthermore, the signal demuliplexer 202 extracts signals corresponding to a data resource (that is, a data signal and a control signal) from the reception signal. The signal demuliplexer 202 outputs the extracted data signal as a reception data signal and outputs the extracted control signal to the discovery signal information receiver 203.

The discovery signal information receiver 203 extracts the discovery signal information from the control signal received from the signal demuliplexer 202 and outputs the discovery signal information to the receiver 201 and the signal demuliplexer 202. The discovery signal information include information indicating the transmission repetition period, the transmission subframe the transmission frequency band, the bandwidth, or RB (Resource Block) or the like. Note that not only the discovery signal information of the cell managed by the base station 100 but also discovery signal information of another cell adjacent to the cell managed by the base station 100 are included.

The RSRP/RSRQ measurement unit 204 identifies the cell by using the discovery signal received from the signal demuliplexer 202 and achieves synchronization with the cell. After the cell synchronization, the RSRP/RSRQ measurement unit 204 measures RSRP using a resource in which the discovery signal is mapped, and measures RSSI using a resource different from the resource in which the discovery signal is mapped. The RSRP/RSRQ measurement unit 204 then calculates RSRQ using measured RSRP and RSSI. The RSRP/RSRQ measurement unit 204 outputs the measurement results including RSRP and RSRQ to the measurement report generator 205.

The measurement report generator 205 generates a measurement report using RSRP or RSRQ of the base station 100, another base station, and a transmission point, and outputs the generated measurement report to the signal assignment unit 206.

The signal assignment unit 206 assigns the transmission data signal and the measurement report received from the measurement report generator 205 to a particular resource of an uplink and transmits them to the transmitter 207.

The transmitter 207 performs a transmission process such as up-converting on the input signal and transmits it.

Operations of Base Station 100 and Mobile Station 200

Operations of the base station 100 and the mobile station 200 configured in the above-described manner are described below.

In the present embodiment, an explanation is given below for a case where PRS (Positioning Reference Signal) already existing in the LTE-Advanced system is used in the design of the discovery signal. PRS is a reference signal for use in measuring position information of a mobile station and is used in measuring timing of downlink signals from a plurality of base stations.

Figure 4:
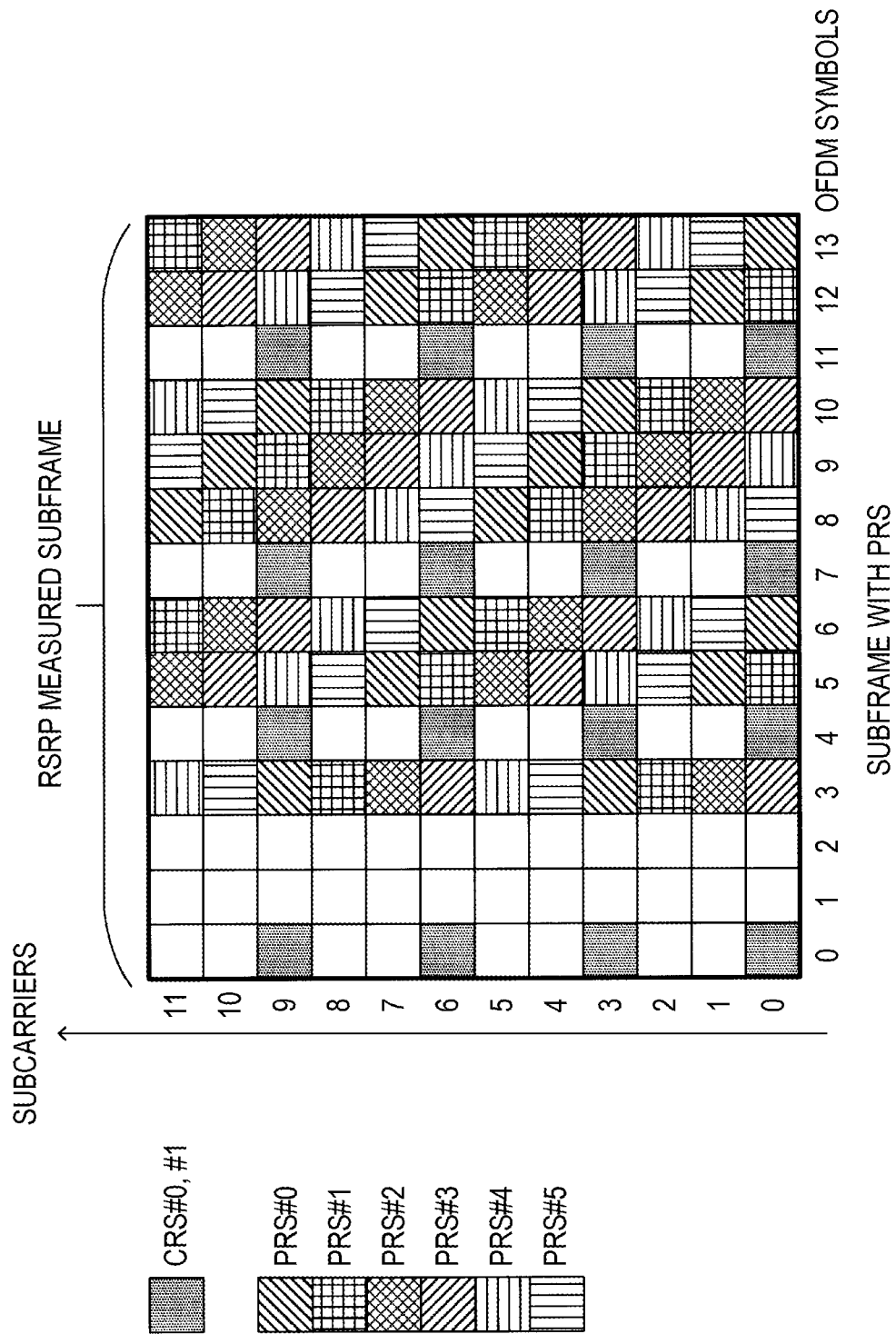
FIG. 4 is a diagram illustrating an example of a subframe for RSRP measurement.

FIG. 4 illustrates an example of PRS mapping. In a case where the number of CRS ports is equal to or less than 2 and normal CP (Cyclic Prefix) is employed, 16 REs (Resource Elements) are mapped per antenna port in each subframe. Note that 1 RE is a unit of resource given by 1 subcarrier×1 OFDM symbol shown in FIG. 4. As shown with PRSs #0 to #5 in FIG. 4, 6 shift patterns are defined according to Cell IDs. Each PRS is scrambled with the cell ID. That is, in FIG. 4, PRSs #0 to #5 may be transmitted from different cells.

Furthermore, as illustrated in FIG. 4, CRSs and PRSs are mapped such that no resource collision occurs.

However, a resource collision is not avoided between DMRS (Demodulation Reference Signal) and PRS, and thus there is a possibility that degradation in performance occurs if DMRS is used when data is transmitted. If it is taken into account a possibility of an occurrence that discovery signals are transmitted from a plurality of cells at the same time using the same subframe, it is desirable to avoid data transmission to increase the accuracy of detection of the discovery signal. Thus, in the following description, it is assumed that data (PDSCH) is not transmitted in a subframe in which PRS is transmitted as a discovery signal.

Figure 5:
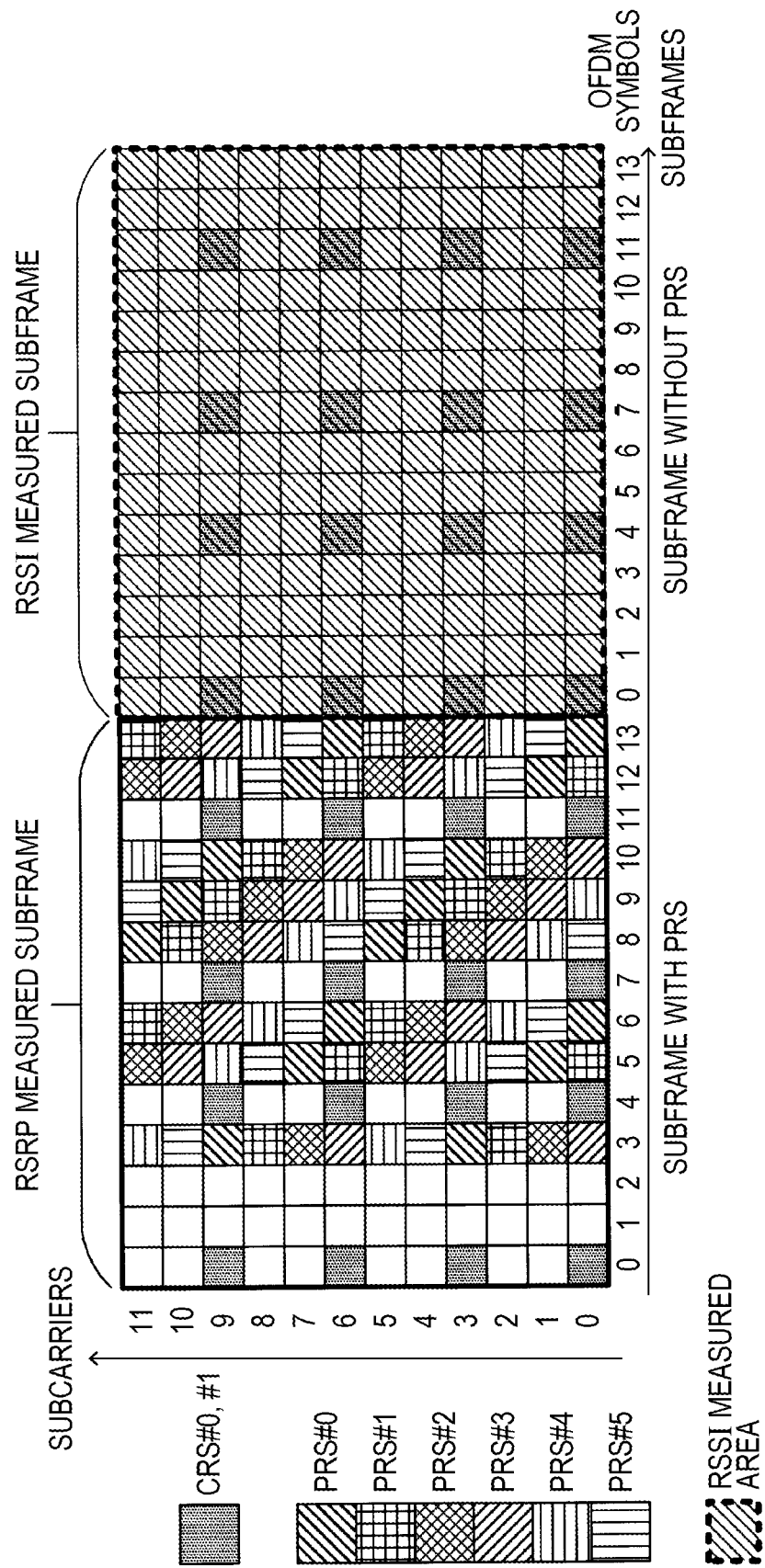
FIG. 5 is a diagram illustrating an RSSI measurement area according to the first embodiment of the present disclosure.

FIG. 5 illustrates an example of an operation of the base station 100 and that of the mobile station 200 according to the present embodiment.

For example, the base station 100 generates discovery signal information by changing transmission parameters set for PRS in terms of a transmission repetition period, a transmission subframe, a transmission frequency band, a bandwidth, an RB, or the like. The base station 100 transmits the discovery signal information as a control signal of a higher layer to the mobile station 200.

The mobile station 200 is instructed to detect a discovery signal in a subframe specified by higher-layer signaling (discovery signal information). The mobile station 200 identifies a cell using PRS transmitted in the subframe in which the discovery signal is detected, and achieves synchronization in terms of time/frequency.

Subsequently, the mobile station 200 measures RSRP and RSSI on the identified cell.

In this measurement, as illustrated in FIG. 5, the mobile station 200 measures RSRP, that is, reception power of the discovery signal in the subframe (RSRP measured subframe) in which the discovery signal is transmitted, and determines the mean value per RE. This measurement is performed using a resource in which the discovery signal (PRS) is mapped. For example, in a case where the discovery signal information indicates information associated with PRS #0, the mobile station 200 measures RSRP (the average reception power of 16 REs in which PRS #0 is mapped) using PRS #0.

On the other hand, as illustrated in FIG. 5, the mobile station 200 measures, as RSSI, the average reception power per OFDM symbol in a subframe (RSSI measured subframe) different from the subframe in which the discovery signal is transmitted. In FIG. 5, the mobile station 200 measures the average reception power (RSSI) per OFDM symbol using all OFDM symbols in the RSSI measured subframe.

As described above, in a subframe in which PRSs used as discovery signals are mapped densely, it is assumed that no data is allocated in any cell. Because no data is allocated in any cell in such a subframe, a mobile station cannot accurately measure traffic from a cell different from a cell to be measured (that is, amount of interference to the cell to be measured). Furthermore, in the subframe in which PRSs from a plurality of cells are densely mapped, the mobile station measures amount of interference in a state (OFF state) different from a state (ON state) in which data is actually transmitted. That is, there is a difference in interference measured by the mobile station between a subframe in which a data signal is transmitted and a subframe in which discovery signals are transmitted.

To handle the above situation, in the present embodiment, the mobile station 200 measures RSSI using another subframe including no discovery signal. In this case, a discovery signal transmitted from a cell in the OFF state is not used in the RSSI measurement performed by the mobile station 200. In the RSSI measured subframe shown in FIG. 5, the mobile station 200 is capable of measuring RSSI such that data from a cell in the ON state is reflected in the measurement, because data is assigned in another cell (in the ON state). That is, in a case where discovery signals and data are not transmitted in the same subframe, the mobile station 200 uses a subframe including a discovery signal as a subframe for RSRP measurement and uses a subframe including no discovery signal as a subframe for RSSI measurement.

In the present embodiment, as described above, the mobile station 200 measures RSRP using a resource in which a discovery signal is mapped, and measures RSSI using a resource different from the resource in which the discovery signal is mapped (using a different subframe in the present embodiment). The mobile station 200 then calculates RSRQ using RSRP and RSSI.

Thus, a discovery signal transmitted from a cell in the OFF state is not included in RSSI measurement performed by the mobile station 200. Furthermore, in an RSSI measured area, the mobile station 200 is capable of measuring RSSI such that data from a cell in the ON state is reflected in the measurement. Thus, the mobile station 200 is capable of measuring RSSI in a resource in which data is transmitted from a cell in the ON state. That is, the mobile station 200 is capable of measuring RSSI corresponding to the traffic without being influenced by the discovery signal. Thus, the mobile station 200 is capable of accurately measuring RSSI even in a case where a discovery signal is transmitted. This results in an increase in RSRQ measurement accuracy, and thus, for example, it becomes possible to select an optimum cell in the cell selection according to the RSRQ criterion.

Note that although the present embodiment has been described for a case where PRS is used as a discovery signal, another existing signal other than PRS may be used as the discovery signal.

Modifications of First Embodiment

OFDM Symbols Used in Measuring RSSI

If the mobile station 200 measures RSSI for all OFDM symbols in a subframe in which RSSI is to be measured and determines the average as shown in FIG. 5, then this results in an increase in the amount of resource used in the averaging. This makes it possible to increase the RSSI measurement accuracy.

However, the method of measuring RSSI in RSSI measured subframes is not limited to that described above, but alternatively, for example, a restriction may be imposed on OFDM symbols used in the RSSI measurement.

For example, OFDM symbols used in the RSSI measurement may be limited to OFDM symbols in which CRSs are mapped. In the case shown in FIG. 5, OFDM symbols subjected to the RSSI measurement are 4 OFDM symbols, that is, OFDM symbols #0, #4, #7, and #11. In a case where cells to be subjected to the comparison in the cell selection are operated using the conventional PSS/SSS/CRS and thus RSSI is measured using only OFDM symbols in which CRSs are mapped, the resultant RSSI includes power of CRSs of a plurality of cells. Therefore, also in cells operating using discovery signals, it is possible to easily make a cell comparison by measuring RSSI according to a similar criterion to the criterion employed in cells operating using PSS/SSS/CRS.

Alternatively, OFDM symbols located in an earlier portion of a subframe or OFDM symbols located in a latter portion of the subframe may be excluded from the RSSI measurement. That is, the OFDM symbols used in the RSSI measurement may be limited to a particular number of OFDM symbols in the earlier portion of the subframe or OFDM symbols in the latter portion of the subframe other than the particular number of OFDM symbols in the earlier portion of the subframe. An OFDM symbol period excluded from the RSSI measurement may be used as a gap period. For example, the gap period may be used as a period in which cell identification, synchronization, and RRM are performed in switching from a currently connected band to another band. By providing a gap period in a subframe used in RSSI measurement, the following advantages are achieved. The mobile station 200 is allowed to use an adjacent subframe before or after a subframe used in the RSSI measurement in order to receive data in the band in connection. Furthermore, in a case where the mobile station 200 goes into a receiving state only when DRX is set from a cell in connection and a discovery signal is detected, then, when the measurement is performed on a cell with the same band as the band of the cell in connection, it is possible to reduce the period in which the receiving state is maintained, and thus it is possible to suppress power consumption.

Subframe Used in RSSI Measurement

As illustrated in FIG. 5, subframes used in the RSSI measurement may be limited to subframes adjacent to subframes in which discovery signals are transmitted. The result of this is that subframes used in RSRP and RSSI are located successively, and thus it becomes possible to reduce the time taken to measure RSRP and RSSI. The reduction in the measurement time makes it possible to reduce a time period in which data transmission from a cell in connection is stopped during the detection of a new cell, which makes it possible to reduce power consumption of the mobile station 200.

Alternatively, subframes used in the RSSI measurement may be limited to particular types. For example, subframes used in the RSSI measurement may be limited to Multimedia broadcast multicast service Single Frequency Network (MBSFN) subframes. No existence of CRS allows each MBSFN subframe to include a corresponding extra amount of data (PDSCH), which makes it possible for a traffic in a band of a cell subjected to RSSI measurement to be easily reflected in a result of RSSI measurement. This is because small cells have no significant interference from CRS and there is a high probability that MBSFN subframes, in which it is easy to use DMRS, are used in data transmission.

Conversely, the subframes used in the RSSI measurement may be limited to non MBSFN subframes. In this case, many OFDM symbols including CRSs appear in the subframes used in the RSSI measurement, and thus the RSSI measurement value may include interference of CRS of a cell in the ON state. In particular, in a case where OFDM symbols used in the RSSI measurement are limited to OFDM symbols in which CRSs are mapped, RSSI is measured in non MBSFN subframes. This results in an increase in the number of OFDM symbols used in the averaging. Furthermore, in a case where a cell under comparison in the cell selection is operating using conventional PSS/SSS/CRS and thus in a case where the RSSI measurement is performed with the limitation to OFDM symbols in which CRSs are mapped, the following advantage is obtained. The RSSI measurement condition for the cell of interest is similar to that for cells operating using discovery signals, which makes it easier to perform the comparison in the cell selection.

Second Embodiment

The first embodiment has been described for a case where PRS is used as a discovery signal. On the other hand, in a second embodiment described below, CSI-RS is used as a discovery signal or PSS/SSS/CRS (reduced PSS/SSS/CRS) with a low transmission rate is used.

In the present embodiment, a base station and a terminal are basically similar in configuration to the base station 100 and the terminal 200 according to the first embodiment, and thus FIG. 2 and FIG. 3 are also used in the following description.

Now detailed descriptions are given below for a case (first example of operation) in which CSI-RS is used as a discovery signal, and a case (second example of operation) in which PSS/SSS/CRS is used.

First Example of Operation

Figure 6:
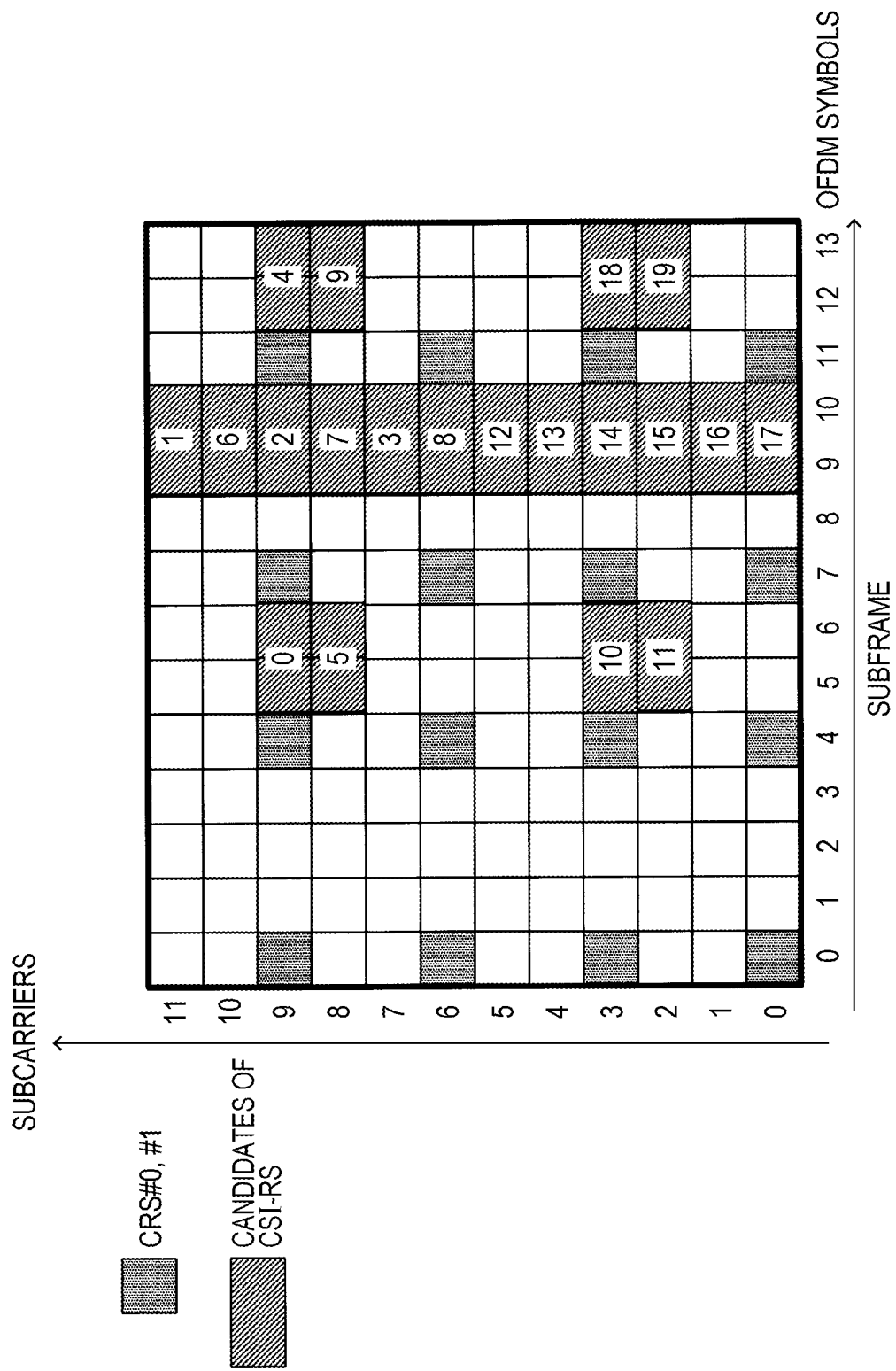
FIG. 6 is a diagram illustrating an example of mapping of CSI-RS candidates.

CSI-RS is a reference signal used in CSI measurement. For example, as illustrated in FIG. 6, in a case where 2 REs per antenna port are allocated with a CDM multiplex level of 2 in Normal CP, it is designed such that it is allowed to orthogonally allocate CSI-RSs for 40 antenna ports per subframe. Furthermore, CSI-RS is scrambled with a cell ID. Locations of CRSs and DMRS are designed such that no collision occurs in terms of locations, and thus PDSCH, which is a downlink data signal, is allowed to be mapped in the same subframe in which CSI-RS is mapped. By notifying the mobile station 200 in advance of REs of CSI-RS used for discovery signals, it becomes possible to allocate PDSCH so as not to be located in REs in which CSI-RS is mapped.

Note that in the mobile station 200, REs to which discovery signals are supposed to be mapped in the reception of PDSCH may be all REs (in Normal CP) to which it is allowed to map discovery signals. Alternatively, mapping of discovery signals may be limited to locations of candidates, specified by the higher-layer signaling, for discovery signals.

As in the first embodiment, the base station 100 generates discovery signal information by changing transmission parameters set for CS-RS in terms of a transmission repetition period, the transmission subframe the transmission frequency band, a bandwidth, an RB, or the like. The base station 100 transmits the discovery signal information, as a higher layer control signal, to the mobile station 200.

As in the first embodiment, the mobile station 200 is instructed to detect a discovery signal in a subframe specified by higher-layer signaling (discovery signal information). The mobile station 200 identifies a cell using CSI-RS transmitted in a subframe in which a discovery signal is detected, and achieves synchronization in terms of time/frequency.

Subsequently, the mobile station 200 measures RSRP and RSSI on the identified cell.

In this measurement, the mobile station 200 measures, as RSRP, reception power of the discovery signal using REs in which discovery signals (CSI-RS) are mapped, and determines the mean value per RE.

Furthermore, the mobile station 200 measures, as RSSI, the average reception power per OFDM symbol in the same subframe in which the discovery signal is transmitted.

More specifically, the mobile station 200 measures RSSI in a subframe subjected to the RSSI measurement by using REs different from REs in which discovery signals (CSI-RS) are mapped.

Figure 7:
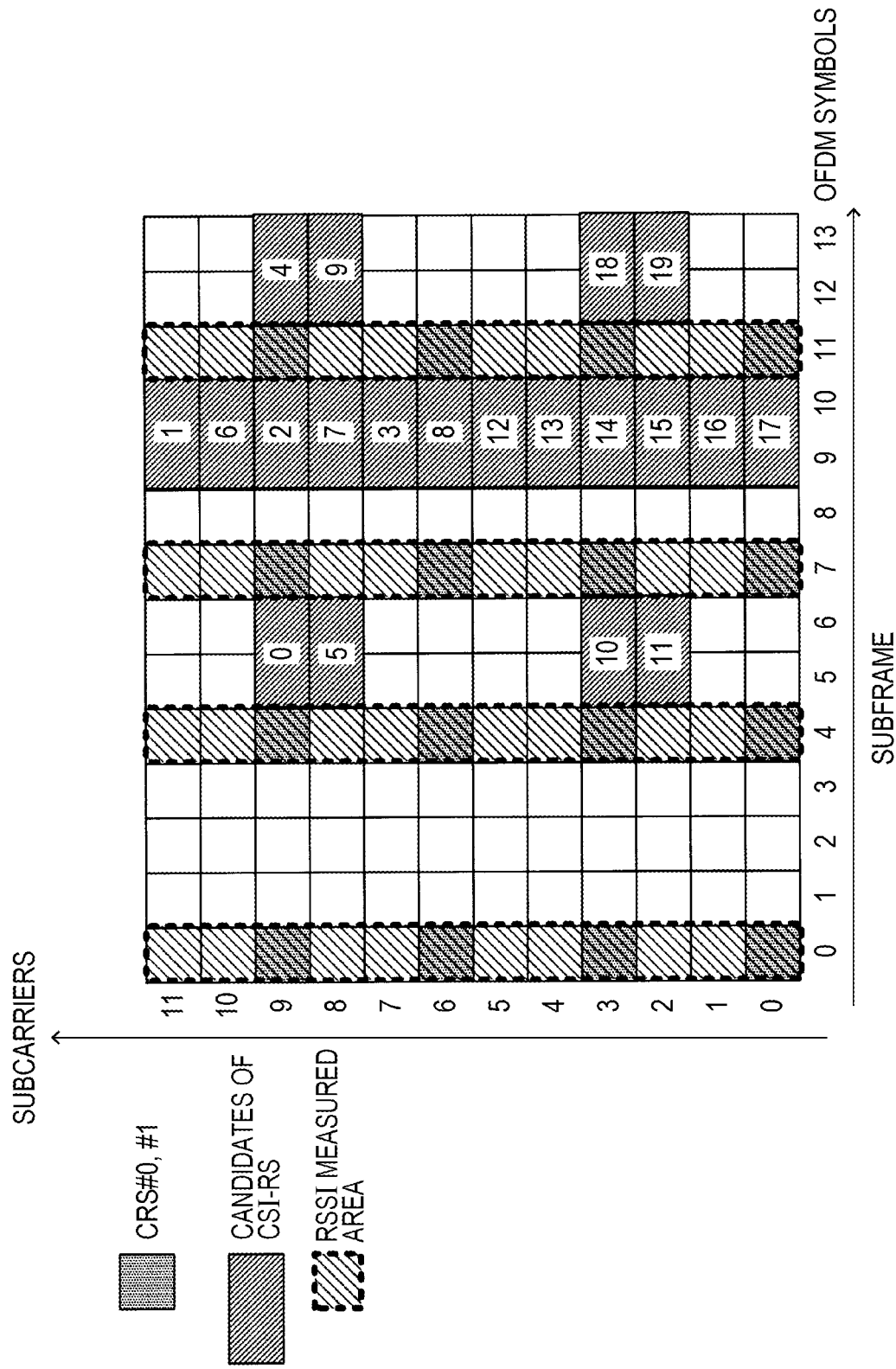
FIG. 7 is a diagram illustrating an RSSI measurement area in a first example of operation according to a second embodiment of the present disclosure.

For example, as illustrated in FIG. 7, the mobile station 200 may measure RSSI using only part of OFDM symbols other than OFDM symbols each including an RE in which a discovery signal (CSI-RS) is mapped wherein the part of OFDM symbols each include CRS. As in the first embodiment, cells to be subjected to the comparison in the cell selection are operated using the conventional PSS/SSS/CRS, and thus in a case where RSSI is measured using only OFDM symbols in which CRSs are mapped, the resultant RSSI includes power of CRSs of a plurality of cells. Therefore, also for a cell operating using a discovery signal, it become possible to easily perform comparison in cell selection by measuring RSSI according to a similar criterion to that employed in a cell operating using PSS/SSS/CRS.

Figure 8:
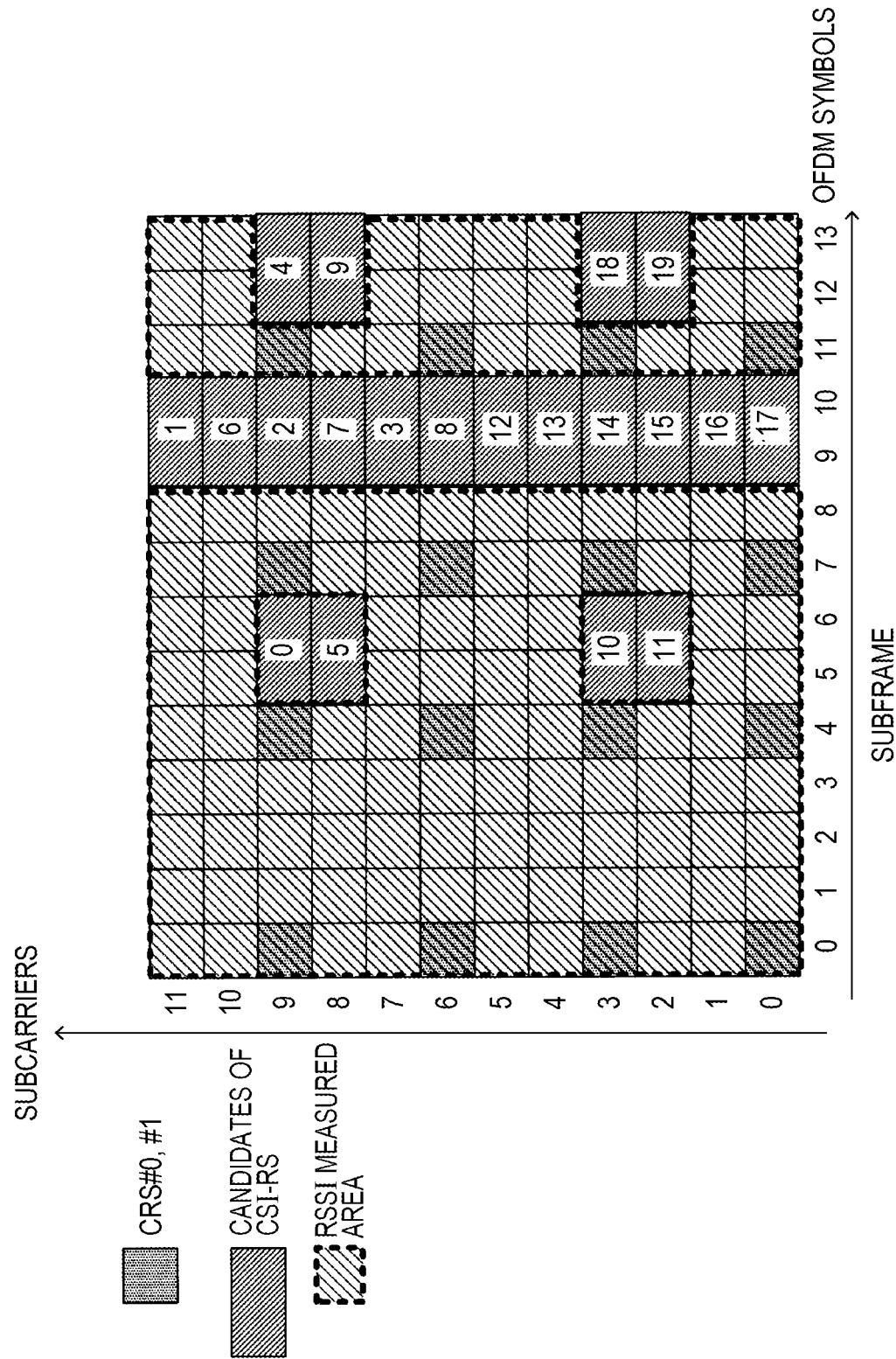
FIG. 8 is a diagram illustrating an RSSI measurement area in a first example of operation according to a second embodiment of the present disclosure.

Alternatively, as illustrated in FIG. 8, without imposing restrictions on OFDM symbols used in the RSSI measurement, the mobile station 200 may measure RSSI using all REs other than REs in which discovery signals are mapped. The increase in the number of OFDM symbols used in the RSSI measurement results in an increase in the amount of resource used in the averaging, and thus it becomes possible to increase the RSSI measurement accuracy.

Note that in the example shown in FIG. 8, some of OFDM symbols used in the RSSI measurement include CSI-RS. However, OFDM symbols including CSI-RS may be excluded from the RSSI measurement. That is, the mobile station 200 may measure RSSI using such OFDM symbols other than OFDM symbols each including an RE in which a discovery signal (CSI-RS) is mapped. For example, in Normal CP in FIG. 8, the mobile station 200 does not use OFDM symbols #5, #6, #9, #10, #12, and #13 in the RSSI measurement but the mobile station 200 measures RSSI using only the other OFDM symbols. When part of REs in OFDM symbols are used in the RSSI measurement, it is necessary to determine the average per OFDM symbol taking into account the number of REs used in the measurement. In contrast, in the case where OFDM symbols including CSI-RS are excluded from the RSSI measurement, RSSI is averaged and given as a power measurement value per OFDM symbol, and thus it becomes possible to easily calculate the average.

In the first example of operation, as described above, subframes used in the RSSI measurement may be the same as the subframes in which discovery signals (CSI-RS) are transmitted. This makes it possible for the mobile station 200 to measure RSRP and RSSI in the same subframe, and thus it is possible to reduce the measurement time.

Second Example of Operation

In the case of Normal CP, PSS is mapped to the OFDM symbol #6 in FDD, while PSS is mapped to the OFDM symbol #2 in TDD. SSS is mapped to the OFDM symbol #5 in FDD, while SSS is mapped to the OFDM symbol #13 in a subframe immediately before a subframe to which PSS is mapped. PSS/SSS is designed so as to avoid a collision with CRS, and thus it is allowed to allocate PDSCH, which is a download data signal, in the same subframe. It is possible to allocate PDSCH so as not to be located in any OFDM symbol in which PSS/SSS is mapped. In the case of Normal CP, when the number of antenna ports for CRS is equal to or less than 2, CRS is mapped to OFDM symbols #0, #4, #7, and #11, while when the number of antenna ports for CRS is equal to 4, CRS is also mapped to OFDM symbols #1 and #8.

Figure 9:
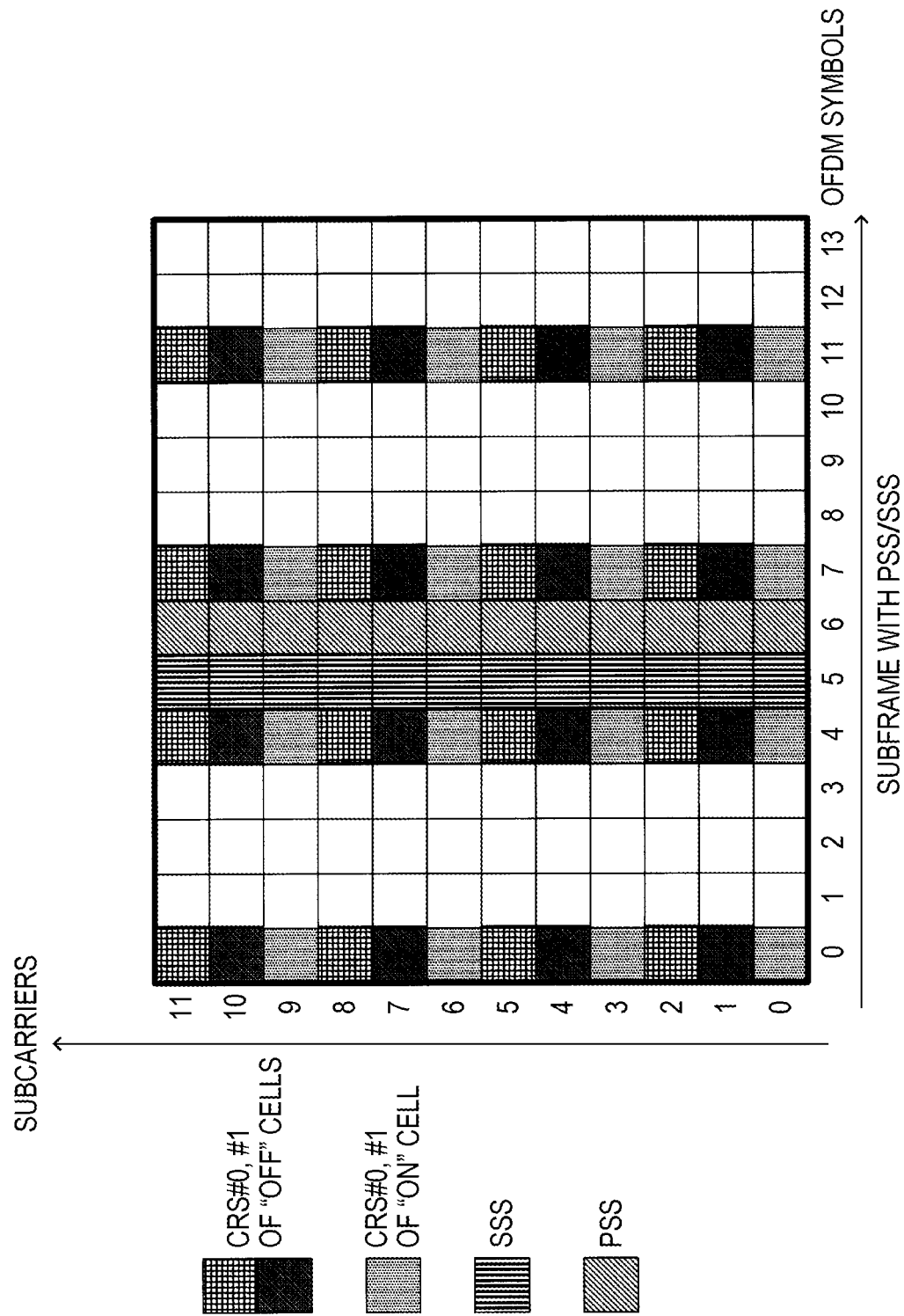
FIG. 9 is a diagram illustrating an example of mapping of CRS/PSS/SSS.

If the number of CRS antenna ports for the discovery signal is set to 2 per cell, then, as illustrated in FIG. 9, there are three CRS-to-RE mapping patterns different depending on cell IDs. In a case where the number of CRS antenna ports for the discovery signal is set to 1 per cell, then there are six CRS-to-RE mapping patterns different depending on cell IDs.

As in the first embodiment, for example, the base station 100 generates discovery signal information by changing transmission parameters set for PSS/SSS/CRS in terms of a transmission repetition period, a transmission subframe, a transmission frequency band, a bandwidth, an RB, or the like. The base station 100 transmits the discovery signal information as a higher-layer control signal to the mobile station 200.

As in the first embodiment, the mobile station 200 is instructed to detect a discovery signal in a subframe specified by higher-layer signaling (discovery signal information). The mobile station 200 identifies a cell using PSS/SSS/CRS transmitted in a subframe in which a discovery signal is detected, and achieves synchronization in terms of time/frequency.

Subsequently, the mobile station 200 measures RSRP and RSSI on the identified cell.

In this measurement, the mobile station 200 measures, as RSRP, reception power of the discovery signal using REs in which discovery signals (CRS) are mapped, and determines the mean value per RE.

Furthermore, the mobile station 200 measures, as RSSI, the average reception power per OFDM symbol in the same subframe in which the discovery signal is transmitted.

More specifically, the mobile station 200 measures RSSI in a subframe subjected to the RSSI measurement by using REs different from REs in which discovery signals (PSS/SSS/CRS) are mapped.

Note that in the second example of operation, CRS is used as the discovery signal, and thus CRS is transmitted not only in cells in the ON state but also in cells in the OFF state. Therefore, the second example of operation is different from the first example of operation in that in subframes in which discovery signals are transmitted, CRS is excluded from the RSSI measurement.

Figure 10:
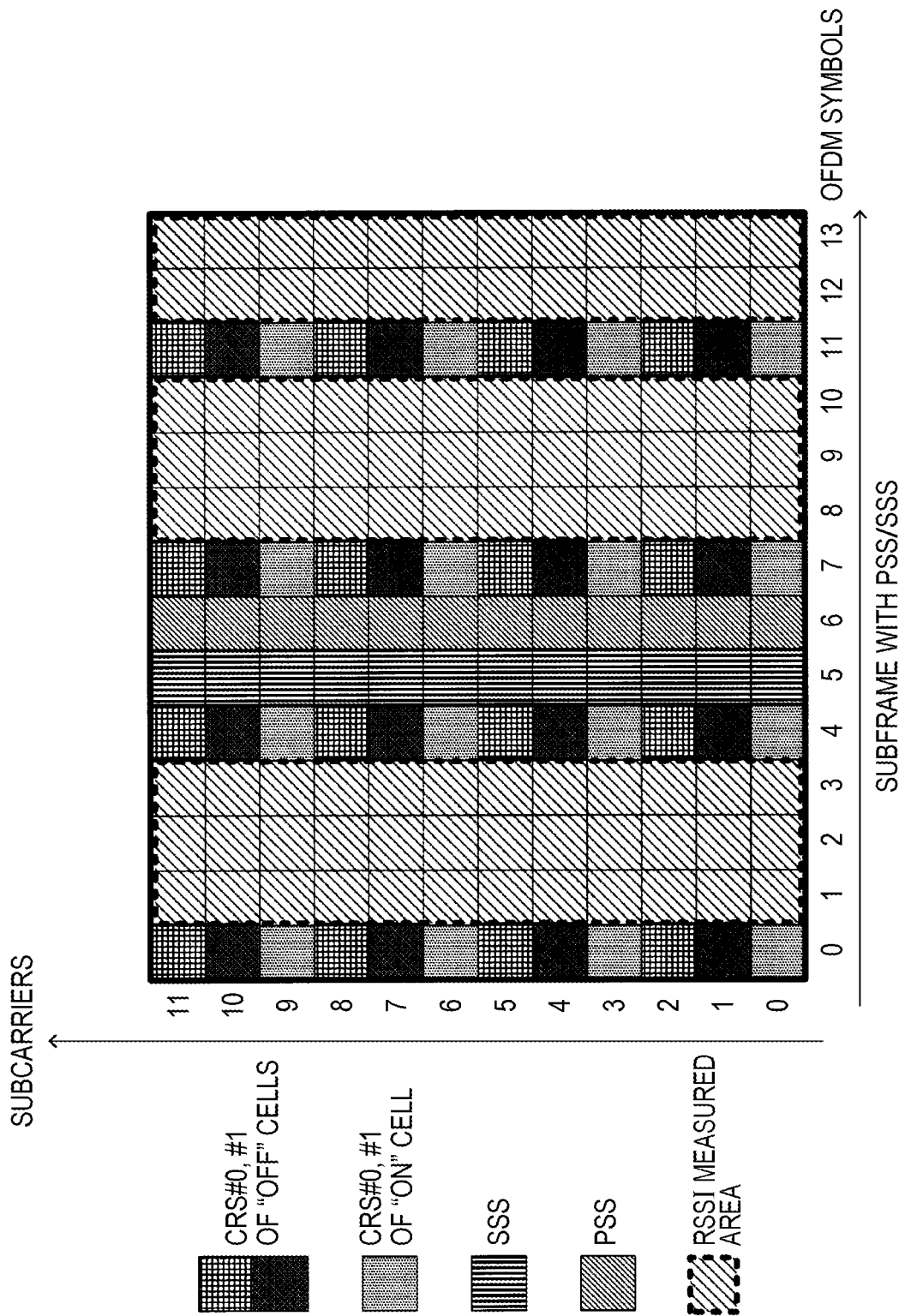
FIG. 10 is a diagram illustrating an RSSI measurement area in a second example of operation according to the second embodiment of the present disclosure.

For example, for subframes in which discovery signals (PSS/SSS/CRS) are transmitted, the mobile station 200 may measure RSSI in a manner described below with reference to FIG. 10. That is, the mobile station 200 may measure RSSI using OFDM symbols other than OFDM symbols in which discovery signals are mapped (that is, using OFDM symbols in which no discovery signal is mapped). For example, in a case where RSSI is measured using the same subframe as the discovery signal, RSSI is measured as follows depending on a situation described below. In Normal CP, when FDD is employed and the number of CRS antenna ports for the discovery signal is set to 2 per cell then, as illustrated in FIG. 10, the mobile station 200 excludes OFDM symbols #0, #4, #5, #6, #7, and #11 from the RSSI measurement and measures RSSI using OFDM symbols #1, #2, #3, #8, #9, #10, #12, and #13. When RSSI is measured using the same subframe as the subframe in which the discovery signal is transmitted, it is possible to measure RSRP and RSSI in the same subframe and thus it is possible to reduce the measurement time.

Figure 11:
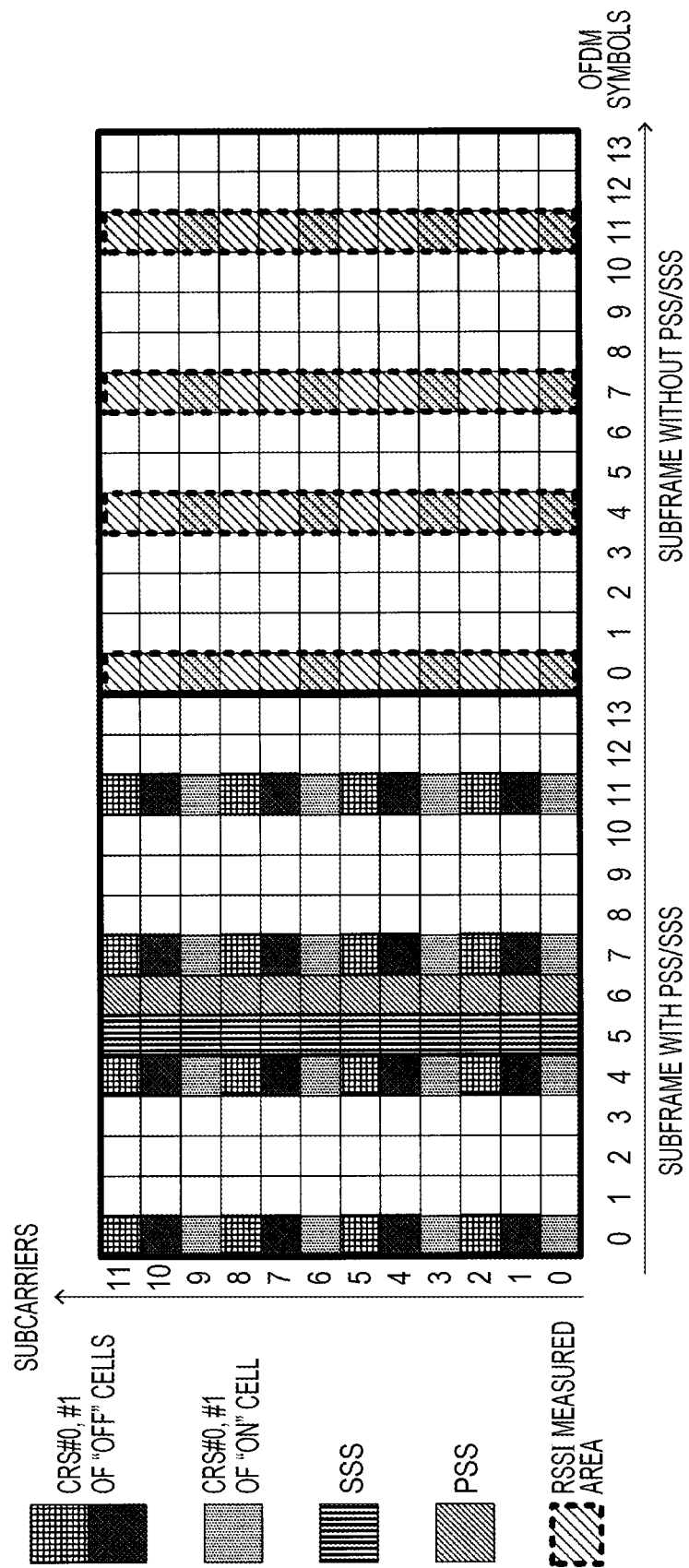
FIG. 11 is a diagram illustrating an RSSI measurement area in a second example of operation according to the second embodiment of the present disclosure.

FIG. 11 illustrates another example of a method of measuring RSSI in the second example of operation. As illustrated in FIG. 11, the mobile station 200 measures RSSI using a subframe in which no discovery signal is transmitted. Furthermore, as illustrated in FIG. 11, in subframes used in RSSI measurement, the mobile station 200 performs the RSSI measurement using only OFDM symbols in which CRS is mapped. Thus, as in the first embodiment, and as in the first example of operation, also for a cell operating using a discovery signal, it become possible to easily perform comparison in cell selection by measuring RSSI according to a similar criterion to that employed in a cell operating using PSS/SSS/CRS.

The RSSI measurement has been described above for the case (the first example of operation) in which CSI-RS is used as the discovery signal and for the case (the second example of operation) in which PSS/SSS/CRS is used as the discovery signal.

In the present embodiment, as described above, the mobile station 200 measures RSRP using a resource in which a discovery signal is mapped, and measures RSSI using a resource different from the resource in which the discovery signal is mapped. The mobile station 200 then calculates RSRQ using RSRP and RSSI. The resource is, for example, an RE, an OFDM symbol, or a subframe.

Thus a discovery signal transmitted by a cell in the OFF state is not subjected to the RSSI measurement performed by the mobile station 200. In the RSSI measured area, the mobile station 200 is capable of measuring RSSI such that data from a cell in the ON state is reflected in the measurement, that is, the mobile station 200 is capable of measuring RSSI in a resource used by a cell in the ON state to transmit data. That is, the mobile station 200 is capable of performing RSSI measurement depending on traffic without being influenced by discovery signals. Thus, as in the first embodiment, the mobile station 200 is capable of accurately measuring RSSI even in a case where a discovery signal is transmitted. This results in an increase in RSRQ measurement accuracy, and thus, for example, it becomes possible to select an optimum cell in cell selection according to the RSRQ criterion.

The present disclosure has been described with reference to embodiments.

Other Embodiments

[1] In the embodiments described above, a mobile station does not necessarily detect all subframes in which discovery signals are transmitted. Therefore, in the embodiments described above, "subframes in which discovery signals are transmitted" may be replaced by "subframes specified to be used in measuring discovery signals".

[2] The design of discovery signals is not limited to PRS, CSI-RS, and PSS/SSS/CRS described above. The design may be made differently such that discovery signals are not used in the RSSI measurement as in the embodiments described above.

[3] In the embodiments described above, explanations have been given by way of example for a case where RSSI is measured in subframes different from those in which discovery signals are mapped. However, depending on a case, there is a possibility that a frequency band in which a discovery signal is transmitted is limited to a part of a frequency band of a cell. In this case, instead of measuring RSSI in subframes different from those in which discovery signals are mapped, RSSI may be measured in a frequency band and RB in which no discovery signal is mapped.

[4] In the embodiments described above, it is assumed by way of example that the present disclosure is implemented using hardware. The present disclosure may be implemented using software in cooperation with hardware.

The functional blocks used in the explanation of the embodiments described above may be typically realized by an LSI, which is an integrated circuit. They each may be realized on one chip individually, or they may all be integrated on one chip. Note that the LSI may be an integrated circuit called an IC, a system LSI, a super LSI, or an ultra LSI depending on the integration scale.

Furthermore, the implementation using the integrated circuit is not limited to that using the LSI, but the implementation may be realized using a dedicated circuit or a general-purpose processor. Alternatively, FPGA (Field Programmable Gate Array) which is allowed to be programmed after the LSI is produced or reconfigurable processor which is reconfigurable in terms of circuit cell connections in the LSI or setting thereof may be used.

When a further advance is made in semiconductor technology or derivative technology and, as a result, integrated circuit technology appears that will replace the LSI, as a matter of course, functional blocks may be integrated using such technology. A possibility of such technology is biotechnology or the like.

In the present disclosure, a mobile station may include a receiver that receives a discovery signal, and a measurement unit that measures Reference Signal Reception Power (RSRP) using a resource in which the discovery signal is mapped, measuring Received Signal Strength Indicator (RSSI) using a resource different from the resource in which a discovery signal is mapped, and calculates Reference Signal Reception Quality (RSRQ) using RSRP and RSSI.

In the mobile station according to the present disclosure, the resource may be a subframe and the measurement unit may measure the RSSI in a second subframe different from a first subframe in which the RSRP is measured.

In the mobile station according to the present disclosure, the measurement unit may measure the RSSI using a plurality of all symbols included in the second subframe.

In the mobile station according to the present disclosure, the measurement unit may measure the RSSI using those symbols in the plurality symbols included in the second subframe that include Cell specific Reference Signal (CRS).

In the mobile station according to the present disclosure, the second subframe may be located adjacent to the first subframe.

In the mobile station according to the present disclosure, the measurement unit may measure the RSSI using symbols that are part of the plurality of symbol included in the subframe in which the RSSI is measured but that are other than a particular number of symbols in an earlier part or a latter part in the subframe in which the RSSI is measured.

In the mobile station according to the present disclosure, the resource may be a subframe and the measurement unit may measure the RSSI in the same subframe as the subframe in which the RSRP is measured.

In the mobile station according to the present disclosure, the resource may be a resource element (RE) and the measurement unit may measure the RSSI using an RE other than any RE in which a discovery signal is mapped.

In the mobile station according to the present disclosure, the measurement unit may measure the RSSI using a symbol other than any symbol including a resource in which a discovery signal is mapped.

In the mobile station according to the present disclosure, the measurement unit may measure the RSSI using a symbol that is other than any symbol including a resource in which a discovery signal is mapped and that includes Cell specific Reference Signal (CRS).

The present disclosure provides a reception quality measurement method including the steps of receiving a discovery signal at the mobile station, and measuring Reference Signal Reception Power (RSRP) using a resource in which the discovery signal is mapped, measuring Received Signal Strength Indicator (RSSI) using a resource different from the resource in which a discovery signal is mapped, and calculating Reference Signal Reception Quality (RSRQ) using RSRP and RSSI.

The present disclosure is useful for a mobile communication system.

The invention claimed is:

1. An integrated circuit comprising:
   circuitry, which, in operation, controls:
      receiving control information indicating subframes to be used in measuring discovery signals; and
      measuring Reference Signal Reception Power (RSRP) and Received Signal Strength Indicator (RSSI) for Reference Signal Reception Quality (RSRQ) by using the subframes indicated by the control information,
   wherein a number of first resource elements used for measuring the RSSI within the subframes is larger than a number of second resource elements used for measuring the RSRP.

2. The integrated circuit according to claim 1, wherein the RSRP is measured based on the discovery signals in the subframes.

3. The integrated circuit according to claim 1, wherein a portion of the first resource elements used for the measurement of the RSSI in the subframes is adjacent along a time axis to the second resource elements used for the measurement of the RSRP in the subframes.

4. The integrated circuit according to claim 1, wherein the control information includes information regarding a period of the subframes to be used in measuring discovery signals.

5. The integrated circuit according to claim 1, wherein a discovery signal is one of a Channel State Information (CSI)-RS, a Primary Synchronization Signal (PSS), a Secondary Synchronization Signal (SSS), and a Cell specific RS (CRS).

6. The integrated circuit according to claim 1, wherein a discovery signal is a signal transmitted from an OFF-state cell which has no traffic data to be transmitted.

* * * * *